Feb. 17, 1931.  W. S. WEIR ET AL  1,793,347
FLEXIBLE COUPLING
Filed Jan. 20, 1928

William Sharpe Weir
Albert Paul Foley
INVENTORS

BY Victor J. Evans
ATTORNEY

WITNESS:

Patented Feb. 17, 1931

1,793,347

UNITED STATES PATENT OFFICE

WILLIAM SHARPE WEIR AND ALBERT PAUL FOLEY, OF PITTSBURGH, PENNSYLVANIA

FLEXIBLE COUPLING

Application filed January 20, 1928. Serial No. 248,221.

This invention relates to a flexible coupling, the general object of the invention being to provide resilient material between two parts to permit relative movement between the parts, with means for completely enclosing the resilient material to prevent injury to the same from wear of a moving part and from contact with oil, grease and the like.

The present invention is an improvement over our prior Patent No. 1,596,327, of August 17, 1926.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 5:
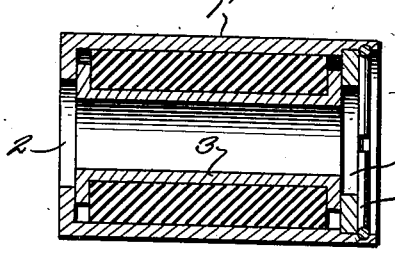
Figure 5 is a view similar to Figure 2, but showing a further modification.
Figure 6:
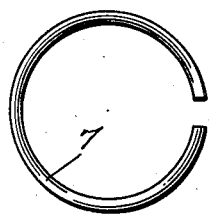
Figure 6 is a view of the locking ring used in Figure 5.

In these views, the numeral 1 indicates a casing preferably formed of brass and having an opening 2 at each end thereof. The numeral 3 indicates a spool-shaped bushing arranged in the casing with its bore registering with the openings 2 and with its flanges overlapping the ends of the casing, said flanges engaging the inner faces of said ends. A sleeve 4 of rubber or other resilient material, surrounds the spool-shaped bushing and has its outer circumference engaging the inner wall of the casing. In order to permit the bushing and sleeve to be placed in the casing, one end of the casing is made removable, as shown at 5. This end may be held in place by internally grooving the end of the casing in which it fits and then bending over the metal at this end of the casing, as shown at 6, or this end may be held in place by a split ring 7, as shown in Figure 5, the removable end 5' bearing against an internal shoulder formed in one end of the casing 1' and the ring fitting in a groove formed in said end, the ring bearing against the ends so as to hold said end in place.

Figure 4:
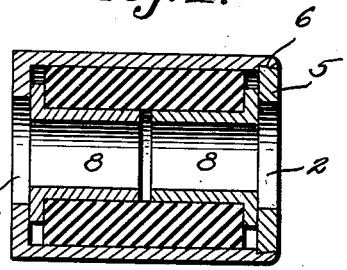
Figure 4 is a view similar to Figure 2, but showing a modification.

Figure 4 shows a slight modification in which the bushing is composed of two sections 8 which are separated at their inner ends.

Figure 1:
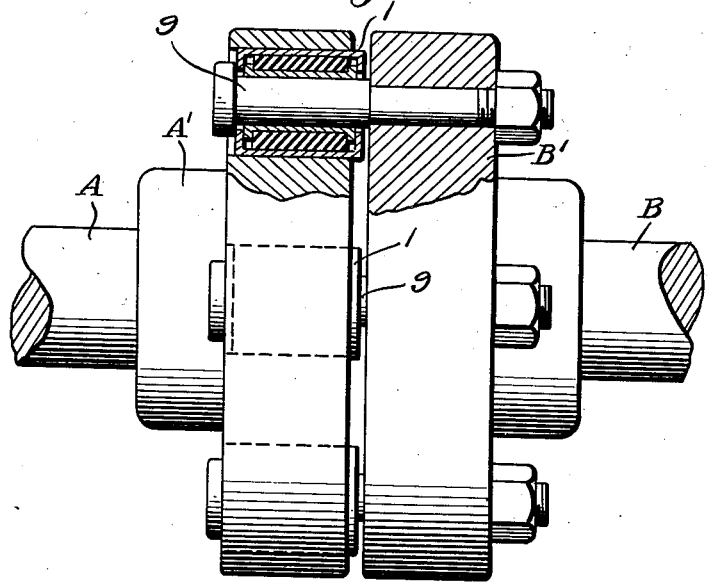
Figure 1 is a view partly in section, showing the invention in use on a flexible coupling.
Figure 2:
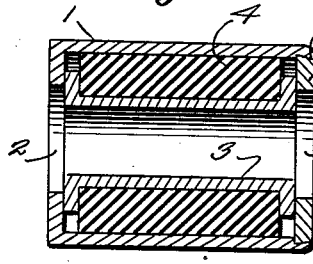
Figure 2 is a sectional view through the parts constituting the invention.
Figure 3:
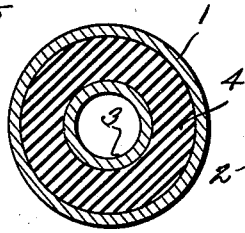
Figure 3 is a transverse sectional view through Figure 2.

Figure 1 shows one way in which the invention may be used, this figure showing a pair of shafts A and B having the coupling members A' and B' secured to their adjacent ends, with the bolts 9 connecting said members together. The member A' is formed with large holes to receive the casings 1 and the enlarged portions of the bolts 9 pass through the bores of the bushings. It must be understood, however, that the invention can be used in other situations, such as motor suspensions in motor vehicles, spring shackles, etc., and wherever resilient material is used to permit relative movement between two parts.

As will be seen, the rubber or resilient material is entirely enclosed by the bushing and the casing so that it cannot be damaged by oil, grease and other foreign material and it is also protected against wear by the parts with which the device is used.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A device of the class described comprising a casing having an inwardly extending flange at each end thereof, the flanges forming circular openings at the ends of the casing, a spool-shaped bushing within the casing, a sleeve of resilient material carried by the bushing and bearing against the inner circumference of the casing, the flanges of the bushing overlapping the flanges of the casing whereby the sleeve is entirely enclosed by the bushing and casing and oil, grease and the like cannot reach the same.

In testimony whereof we affix our signatures.

WILLIAM SHARPE WEIR.
ALBERT PAUL FOLEY.